(12) United States Patent
Ayyagari et al.

(10) Patent No.: US 9,407,638 B2
(45) Date of Patent: Aug. 2, 2016

(54) SYSTEM AND METHOD FOR TRUSTED MOBILE COMMUNICATIONS

(71) Applicant: The Boeing Company, Chicago, IL (US)

(72) Inventors: Arun Ayyagari, Seattle, WA (US); Richard Blair, Kent, WA (US); Lester Houston, III, St. Louis, MO (US); Eric Martens, Crestwood, MO (US); John Bush, Bothell, WA (US); Greg Kimberly, Seattle, WA (US); Kristine Lane, Duvall, WA (US); David Corman, Creve Coeur, MO (US)

(73) Assignee: The Boeing Company, Chicago, IL (US)

( * ) Notice: Subject to any disclaimer, the term of this patent is extended or adjusted under 35 U.S.C. 154(b) by 7 days.

(21) Appl. No.: 13/975,936

(22) Filed: Aug. 26, 2013

(65) Prior Publication Data

US 2015/0058929 A1 Feb. 26, 2015

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04W 12/08* | (2009.01) |
| *H04L 29/08* | (2006.01) |

(52) U.S. Cl.
CPC ............ *H04L 63/10* (2013.01); *H04L 63/0823* (2013.01); *H04L 63/0876* (2013.01); *H04L 63/102* (2013.01); *H04W 12/08* (2013.01); *H04L 67/12* (2013.01)

(58) Field of Classification Search
CPC ..... H04L 63/10; H04L 63/0823; H04L 67/12; H04L 63/102; H04L 63/0876; H04W 12/08

USPC .............................................................. 726/3
See application file for complete search history.

(56) References Cited

U.S. PATENT DOCUMENTS

| | | | |
|---|---|---|---|
| 6,247,127 | B1* | 6/2001 | Vandergeest .................. 713/100 |
| 7,039,801 | B2 | 5/2006 | Narin |
| 8,327,131 | B1 | 12/2012 | Hardjono et al. |
| 8,479,292 | B1 | 7/2013 | Linhardt |
| 8,732,474 | B1 | 5/2014 | Perry |
| 9,021,246 | B2 | 4/2015 | Baltes |
| 2003/0027550 | A1* | 2/2003 | Rockwell ....................... 455/410 |
| 2003/0188165 | A1 | 10/2003 | Sutton, II et al. |
| 2004/0039937 | A1 | 2/2004 | Aissi et al. |
| 2005/0149726 | A1 | 7/2005 | Joshi et al. |
| 2005/0260973 | A1* | 11/2005 | van de Groenendaal ......... H04L 63/102 455/411 |

(Continued)

OTHER PUBLICATIONS

U.S. Appl. No. 14/159,127, filed on Jan. 20, 2014.
Salter et al., Toward A Secure System Engineering Methodology, http://www.schneier.com/paper-secure-methodology.pdf, New Security Paradigms Workshop, Sep. 1998, pp. 2-10.
Office Action dated Sep. 11, 2015 for U.S. Appl. No. 14/159,127.
Extended European Search Report, Patent Application No. 14181019.2 dated Dec. 15, 2014.

(Continued)

*Primary Examiner* — Michael S McNally
*Assistant Examiner* — Amie C Lin
(74) *Attorney, Agent, or Firm* — Kunzler Law Group, PC

(57) ABSTRACT

Systems and methods for trusted mobile communications are described. A network system provisions a mobile client system with a collection of security parameters on a per application basis and a per device basis. The airplane system provides access to the mobile client system based on the established chain of trust without previously having information about the mobile client system even when the mobile client system and the airplane system are offline with respect to the network system.

17 Claims, 5 Drawing Sheets

(56) References Cited

U.S. PATENT DOCUMENTS

| | | |
|---|---|---|
| 2007/0143629 A1 | 6/2007 | Hardjono et al. |
| 2009/0204823 A1 | 8/2009 | Giordano et al. |
| 2009/0205032 A1* | 8/2009 | Hinton et al. ............... 726/7 |
| 2009/0228704 A1 | 9/2009 | de Atley et al. |
| 2009/0265756 A1 | 10/2009 | Zhang et al. |
| 2010/0043061 A1* | 2/2010 | Martin et al. ............... 726/4 |
| 2011/0113427 A1 | 5/2011 | Dotan |
| 2011/0179477 A1 | 7/2011 | Starnes et al. |
| 2012/0009951 A1* | 1/2012 | Poland ...................... 455/457 |
| 2014/0380058 A1 | 12/2014 | Agarwal |
| 2014/0380501 A1* | 12/2014 | Niss ........................ 726/27 |
| 2015/0052616 A1 | 2/2015 | Hutchison et al. |

OTHER PUBLICATIONS

European Search Report for Application No. 15151215.9 dated Jun. 19, 2015.

Notice of Allowance for U.S. Appl. No. 14/159,127 dated Feb. 2, 2016.

Office Action for Canadian Patent Application No. 2,854,313 dated May 11, 2016.

* cited by examiner

SYSTEM AND METHOD FOR TRUSTED MOBILE COMMUNICATIONS

FIELD

Some examples of the present disclosure relate to communications and, in particular, trusted mobile communications.

BACKGROUND

Aviation platforms and infrastructures have many complex systems that are networked hierarchically to perform various aviation computing needs. The adoption of e-Enabled architectures and technologies increases the operational and performance efficiencies that result from being networked. Furthermore, aviation embedded systems and controllers are being hosted on general purpose processing (GPP) hardware and use commercial software operating systems to reduce cost and increase functionalities.

The use of GPP hardware and commercial software operating systems in addition to increased connectivity between aviation systems has resulted in an increase in feature capabilities and functionalities of aviation platforms. Some of these capabilities include the ability to upload and download data from onboard flight systems from external custom client devices. Currently these custom client devices are specialized devices that are configured, programmed and managed specifically for the task at hand.

Currently, custom devices comprised of specific hardware and software components are allowed to connect to onboard airplane system. Airlines are expected to follow rigorous configurations and procedural processes for these custom devices. These custom devices are an additional expense to purchase, manage, and maintain given the procedural processes during which human operators are to maintain high degrees of compliance to procedures and processes. Additionally, both the hardware and software used by the custom client devices have short refresh cycles and rapidly become obsolete due to the pace of technological change. Airplane systems, on the other hand, are built to a very high degree of integrity and safety and are hence updated infrequently at fairly long intervals and furthermore are often not connected to an external network. As a result, the validity of the cyber security integrity of a connected custom client device may be challenging to establish. Airplane systems and airline back-office systems are also long-lived, making it problematic to procure the necessary hardware and software components to replace the appropriate specified devices during the entire life cycle of the airplane. Flight crews, maintenance workers, and others currently use manual data entry processes to perform various tasks on the airplane. Manual data entry is time consuming and error prone.

Connected client devices might perform many of these tasks if there was a mechanism in place to verify the condition and status of the device and application from a security perspective. There are no viable approaches that solve the problem of authoritatively establishing integrity of data from resource-constrained client devices in offline modes of operation in which the airplane system that retrieves data from the resource-constrained client device is not connected to the airline back-office system while adhering to the deployment and business/operational constraints of airline operations.

Commercial off the shelf (COTS) mobile devices are familiar to end users and are already used for non-flight related applications. However, the increase in functions and networked connections of aviation systems has also increased the risk of cyber security attacks that leverage existing vulnerabilities of the deployed software and hardware implementations. The COTS systems and their associated vulnerabilities can be used as a vector for cyber attacks.

Until now, there has been no simple and efficient viable mechanism to authoritatively establish the integrity of data retrieved from resource-constrained client devices in an offline mode of operation. The offline mode of operation will result in field deployment/operational scenarios in which communication network connectivity of the client device or the airplane to the airline back-office systems is not available. In such an environment, authoritative establishment of data integrity from resource constrained client devices is a challenge.

BRIEF SUMMARY

A system, method and/or device is provided for use in trusted mobile communications, substantially as shown in and/or described in connection with at least one of the figures, as set forth more completely in the claims.

Some examples provide a method for trusted mobile communications. The method can include, for example, provisioning, by a network system, a mobile client system with a collection of security parameters on a per application basis and a per device basis; and providing the mobile client system access to an airplane system based on the collection of security parameters when the mobile client system and the airplane system are offline with respect to the network system.

Some examples provide a system for trusted mobile communications. The system can include, for example, a network system and a mobile client system in communications with the network system when the mobile client system is online with respect to the network system. The network system can provision the mobile client system with a collection of security parameters on a per application basis and a per device basis. The mobile client system is provided access to an airplane system based on the collection of security parameters when the mobile client system and the airplane system are offline with respect to the network system.

Some examples provide a mobile wireless communication device. The mobile wireless communication can include, for example, one or memories, and one or more processors that are coupled to the one or more memories. The one or more processors can be configured to receive a collection of security parameters from a network system on a per application basis and a per device basis, and access an airplane system based on the collection of security parameters when the mobile wireless communication device and the airplane system are offline with respect to the network system.

These and other advantages, aspects and novel features, as well as details of an illustrated example thereof, will be more fully understood from the following description and drawings.

The features, functions, and advantages that have been discussed can be achieved independently in various examples or may be combined in yet other examples, further details of which can be seen with reference to the following description and drawings.

DETAILED DESCRIPTION

Some examples provide systems and methods for trusted mobile communications. Many specific details of certain examples are set forth in the following description as well as the drawings to provide a thorough understanding of such examples. One skilled in the art, however, will understand that there may be additional examples, or that certain of these examples may be practiced without several of the details described in the following description. Like numbers refer to like elements throughout.

Some examples assess the integrity and condition of a mobile client system and client applications from a cyber-security perspective before allowing either network connectivity or application interaction with an airplane system while assuming that neither the mobile client system nor the airplane system has reach-back network connectivity to the airline back-office system. In an example, a digital notary accessible by the airline back-office system is used to establish a chain of trust for a collection of system security attributes that is later used by onboard airplane systems to assess the health and condition of the mobile client system and to assign access control parameters to airplane internal systems. Access control parameters can be assigned to the mobile client system even though the mobile client system has not been previously registered to a particular airplane system and even though the mobile client system and the airplane system are assumed to not have reach-back connectivity to the airline back-office.

Some examples establish a chain of trust for a set of security parameters that are gathered on the mobile client system while connected to the airline back-office present in an airline corporate network. The security parameters are then used by the onboard airplane system to assign various access control constraints to onboard systems, data, and applications where both the mobile client system and the airplane system are assumed to not have reach-back connectivity to the airline back-office for networked authentication, authorization, and accounting (AAA) purposes. The chain of trust is a basis for establishing a level of trust for a mobile client system that has not been previously registered with a specific onboard airplane system and can be effective even when there is no reach-back connectivity to the airline back-office.

Figure 1:
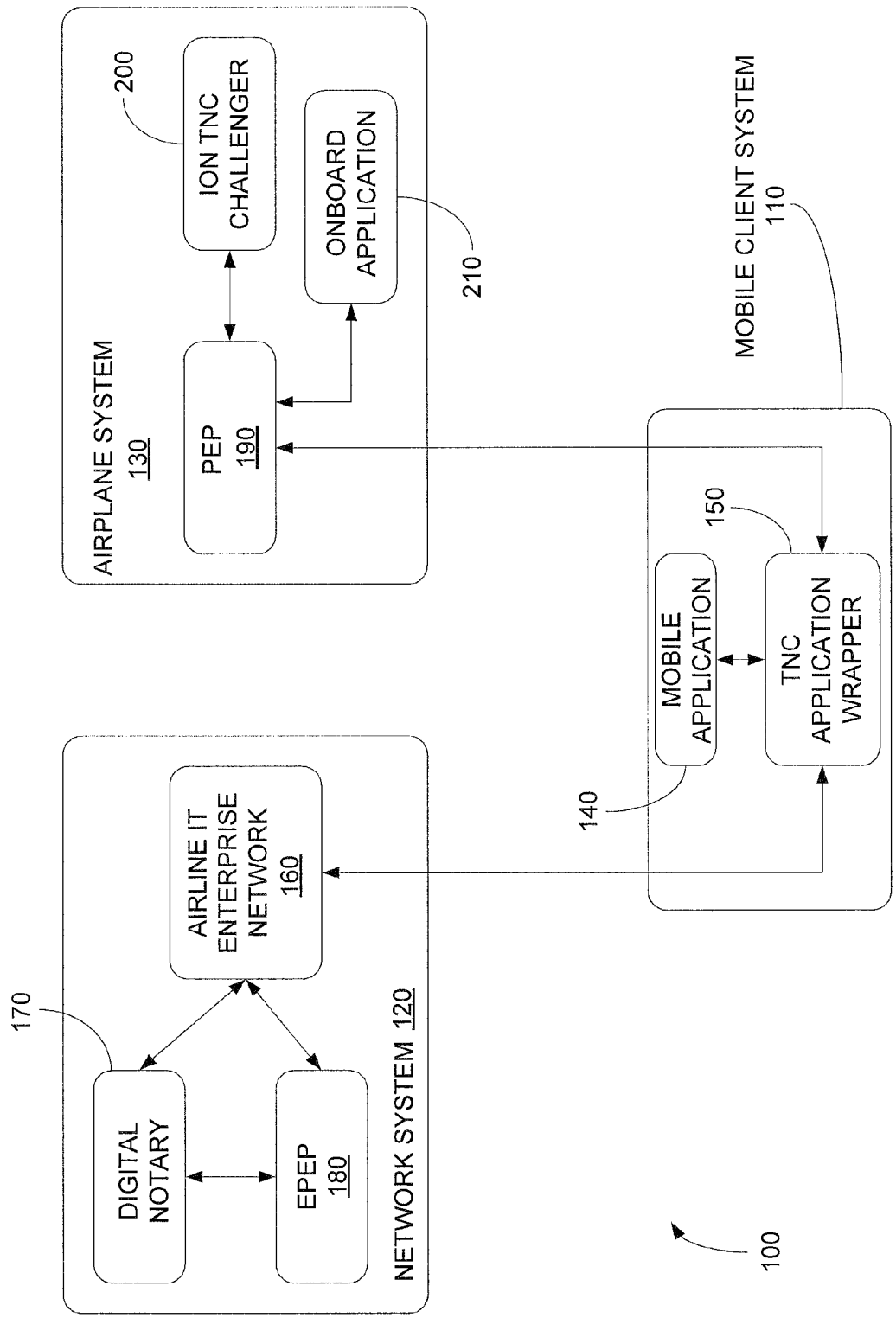
FIG. 1 shows an example of a system for trusted mobile device and application services interconnectivity to an airline back-office system and an airplane system.

Referring to FIG. 1, an example of a system for trusted mobile device and application services interconnectivity to an airline back-office system and an airplane system is illustrated. The system 100 can include, for example, a mobile client system 110, a network system 120 and an airplane system 130.

The mobile client system 110 can be coupled, via a wireless link and/or a wired link, to the network system 120 and/or to the airplane system 130. The mobile client system 110 can be, for example, a mobile wireless communication device, a mobile phone, a smartphone, a laptop, a computing tablet, a personal digital assistant, etc. The mobile client system 110 can also be a commercial off the shelf (COTS) mobile device. In an example, the mobile client system 110 can be configured for different types of wireless communication and wired communication. Referring to FIG. 1, the mobile client system 110 provides a mobile application such as a commercial aviation services (CAS) application 140 and a trusted network connect (TNC) application wrapper 150. The CAS application 140 is merely an example of a mobile application to facilitate discussions herein. In an example, the mobile client system 110 can provide one or more other mobile applications instead of or in addition to the CAS application 140. The CAS application 140 can include, for example, an aviation service provider application and can be used for airplane operations, services and maintenance. The TNC application wrapper 150 can be used to perform a system audit (e.g., a passive and/or active system audit) of the mobile client system 110, to manage certificates, to manage application control, and to add, delete and/or decrypt data stored on the mobile client system 110. The CAS application 140 and the TNC application wrapper 150 are configured to communicate with each other. The TNC application wrapper 150 is also configured to communicate with the network system 120 and the airplane system 130. The TNC application wrapper 150 can be executed before the execution of main applications and can determine how to connect with other systems and how to move data to and from the other systems, for example.

Referring to FIG. 1, an example of the network system 120 can include, for example, an airline information technology (IT) enterprise network 160, a digital notary 170 and an enterprise policy enforcement point (EPEP) 180. The airline IT enterprise network 160, the digital notary 170 and the EPEP 180 can be configured to communicate with each other. The airline IT enterprise network 160 and the mobile client system 110 can be configured to communicate with each other. The network system 120 or a portion thereof can be part of an airline back-office system. For example, an airline back-office system can include the network system 120. Another example of the airline back-office system can include the airline IT enterprise network 160 and the EPEP 180. Yet another example of the airline back-office system can include the airline IT enterprise network 160.

Referring to FIG. 1, an example of the airplane system 130 can include, for example, a policy enforcement point (PEP) 190, an isolated onboard network (ION) TNC challenger 200, and an onboard application. The airplane system 130 can provide broadband onboard and off-board connectivity for onboard and off-board applications. The airline system 130 is compatible with COTS laptops, tablets, smartphones, mobile wireless communication devices, etc. that connect with the airplane system 130 to perform e-Enabled services. The airline system 130 can provide, for example, one or more of the following: wired Ethernet ports, servers, a core network, printers, local area networks (LANs), wide area networks (WANs), personal area networks (PANs), LAN/WAN/PAN terminal devices, wireless LANs/WANs/PANs, and wireless LAN/WAN/PAN terminal devices. The airplane system 130 can provide e-Enabling onboard equipment and devices that can be configured for and/or can provide, for example, one or more of the following: onboard maintenance and monitoring; testing, data, log or file upload or download; crew information systems; wireless maintenance access; wireless operations access; onboard performance tools; electronic document browsers; and remote deployment of software, data, charts and manuals.

In an example, the PEP 190, the ION TNC challenger 200 and the onboard application 210 can be part of an ION 220. In an example, the ION TNC challenger 200 can include, for example, an application challenger server (ACS) and a policy decision point (PDP). The PEP 190 and the ION TNC challenger 200 can be configured to communicate with each other. The PEP 190 and the onboard application 210 can be configured to communicate with each other. The PEP 190 and the mobile client system 110 can be configured to communicate with each other.

Figure 2:
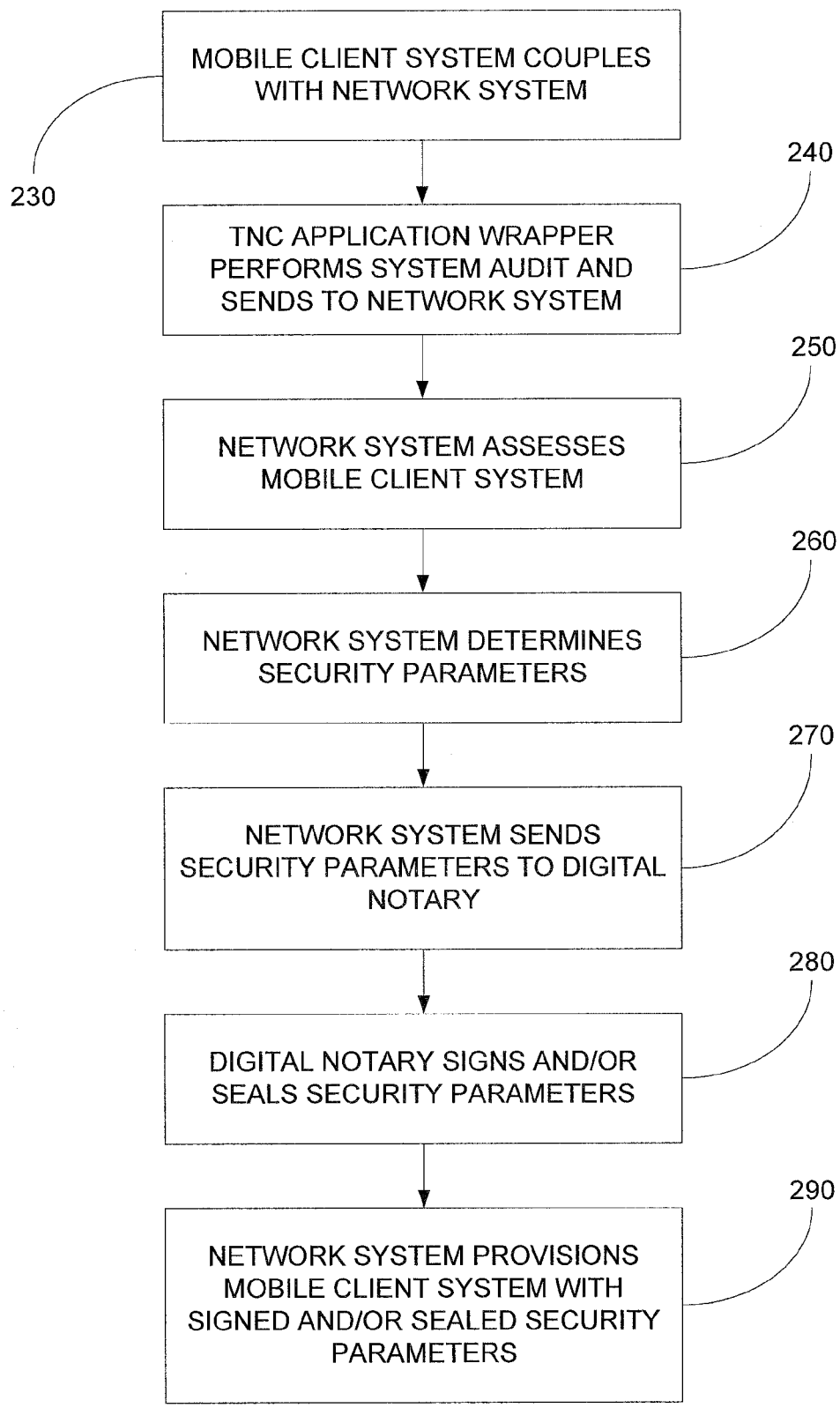
FIG. 2 shows a flowchart for an example of a method for trusted mobile device and application services interconnectivity to an airline back-office system.

Referring to FIGS. 1-3, the operation of the system 100 according to an example is described.

In step 230, the mobile client system 110 couples with the network system 120 via a wireless link and/or a wired link. In an example, the TNC application wrapper 150 of the mobile client system 110 can set up a transport layer security (TLS)/TNC connection with the network system 120.

In step 240, the TNC application wrapper 150 of the mobile client system 110 performs a system audit of the mobile client system 110. The system audit can be, for example, an updated system audit. The result of the audit is a set of parameters that are sent to the network system 120. The parameters can indicate, for example, one or more of the following: operating system, applications, application parameters, mobile client system condition, hardware configurations, boot parameters, and identity of the mobile client system 110. In an example, the set of parameters is sent to the airline IT enterprise network 160. The set of parameters can also include, for example, a cryptographic nonce, provided by the airline IT enterprise network 160, to prevent simple play back attacks.

In step 250, the network system 120 assesses the mobile client system 110. The assessment includes, for example, analyzing the set of parameters received by the network system 120 from the mobile client system 110. In an example, the airline IT enterprise network 160 receives the set of parameters from the mobile client system 110 and assesses the mobile client system 110 by analyzing the set of parameters. In an example, the airline IT enterprise network 160 determines whether it is familiar with the mobile client system 110 by comparing the identity of the mobile client system 110 with a mobile device management (MDM) database. The airline IT enterprise 160 assesses the health and condition of the mobile client system 110 from the received set of parameters.

In step 260, the network system 120 determines a collection of security parameters based on the assessment of the client mobile system 110. In an example, the EPEP 180 determines a collection of security parameters including, for example, one or more of the following: credentials, rules and limitations (e.g., access limitations, location limitations, etc.) for the mobile client system 110. The network system 120 also assigns a device identity certificate for the mobile client system 110.

In step 270, the network system 120 sends the collection of security parameters to a digital notary 170. In an example, the EPEP 180 sends the collection of security parameters to a digital notary 170. The digital notary 170 can be a well known or private certification authority (e.g., VeriSign, airline, etc.). The digital notary 170 can include, for example, a plurality of certification authorities.

In step 280, the digital notary 170 signs and/or seals the collection of security parameters. In an example, the digital notary 170 encrypts the collection of security parameters with a current data certificate. In an example, the digital notary 170 signs and/or seals the collection of security parameters with one or more keys. In an example, the collection of security parameters can be run through a hash function. In an example, the signed and/or sealed collection of security parameters includes, for example, provisioning profiles and a signed type-length-value (TLV) collection of parameters. The TLV collection of parameters signed by the digital notary 170 can include, for example, one or more of the following: a device identity certificate, a date of signing, an expiration duration (e.g., a time-to-live parameter), operational location for geo-fencing purposes (e.g., location restrictions), airplane flight phase restrictions, and encrypted application specific data. The digital notary 170 can be used to establish a chain of trust for the collection of security parameters.

In step 290, the network system 120 provisions the mobile client system 110 with the collection of security parameters (e.g., the signed and/or sealed collection of security parameters). In an example, the network system 120 provisions the mobile client system 110 with the collection of security parameters on a per application basis and/or on a per device basis. In an example, the signed and/or sealed collection of security parameters is sent from the digital notary 170 to the EPEP 180 which sends, via the airline IT enterprise network 160, the signed and/or sealed collection of security parameters to, for example, the TNC application wrapper 150 of the mobile client system 110). In an example, the mobile client system 110 can be provisioned with, for example, MDM profiles that enforce company policy; and/or one or more TNC certificates that include, for example, device identity and that chain back to the digital notary 170. Thus, the provisioning of the mobile client system 110 is based on the assessment of the mobile client system 110 by the network system 120, which, in turn, is based on the system audit of the mobile client system 110 by the TNC application wrapper 150.

Figure 3A:
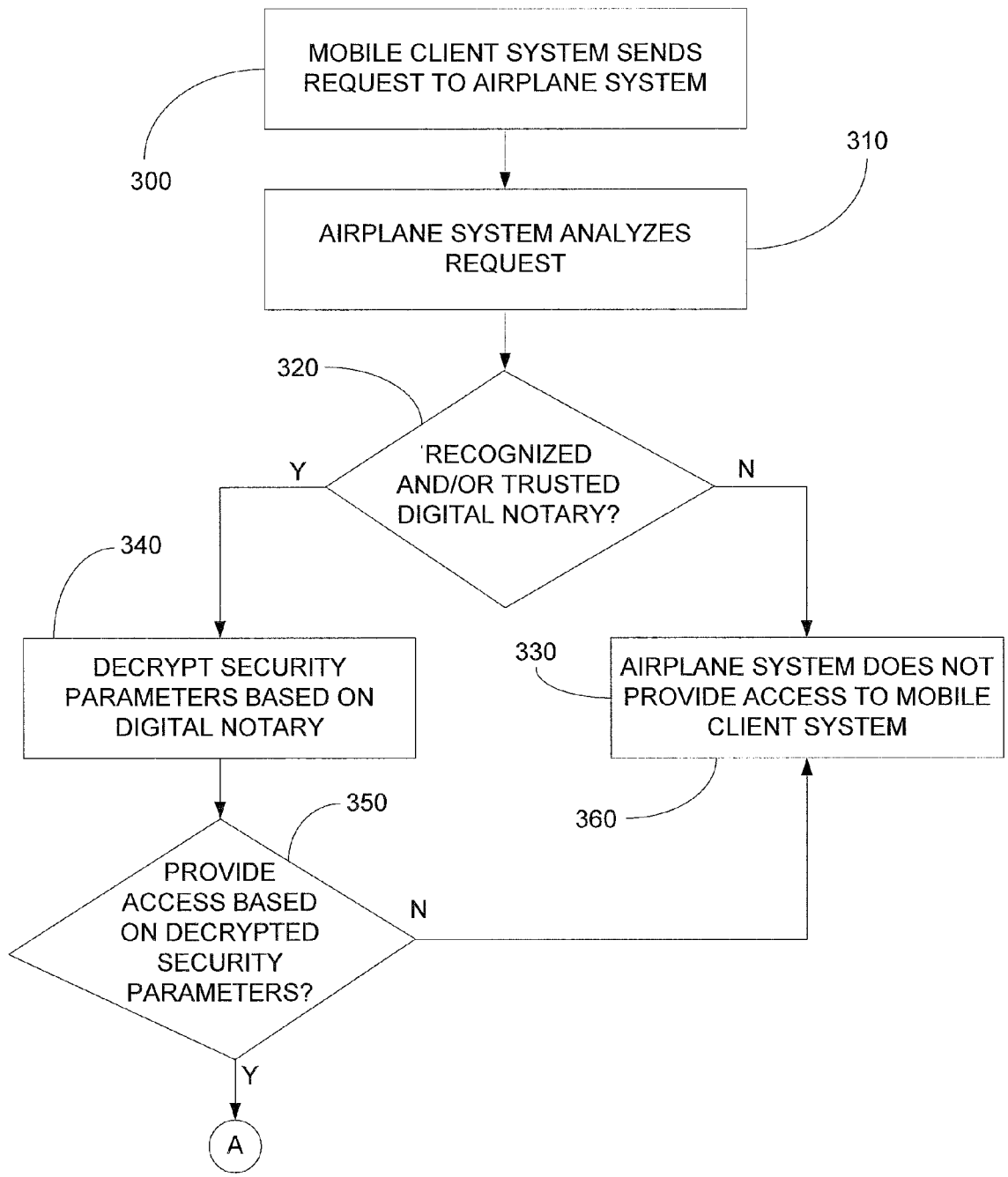
FIGS. 3A-B show a flowchart for an example of a method for trusted mobile device and application services interconnectivity to an airplane system.

Referring to FIG. 3A, in step 300, the mobile client system 110 sends a request for access to the airplane system 130 via a wireless link and/or a wired link. In an example, the mobile client system 110 is in or near the airplane with the airplane system 130. In an example, neither the mobile client system 110 nor the airplane system 130 is in communications with the network system 120. The mobile client system 110 can establish a TLS/TNC connection using an assigned device identity certificate. The certificate can be used to decrypt data. The request can include, for example, the signed and/or sealed collection of security parameters to the airplane system 130. In an example, the request includes the TLV collection of parameters signed by the digital notary 170. The request can also include, for example, a system audit of the mobile client system 110. The system audit can be the previous system audit that was performed by the TNC application wrapper 150, for example, or the system audit can be an updated or new system audit performed by the TNC application wrapper 150. In an example, the TNC application wrapper 150 of the mobile client system 110 sends the request to the PEP 190 of the airplane system 130. The request can also include, for example, a cryptographic nonce, provided previously by the network system 120, to prevent simple play back attacks. In an example, the signed and/or sealed collection of security parameters stored by the mobile client system 110 is accompanied by a matching set of parameters freshly signed by a high-security hardware module (e.g., a Trusted Platform Module) inside the mobile client system 110 before being presented to the airplane system 130. This method allows the airplane system 130 to validate the freshness of the security state of the mobile client system 110.

In step 310, the airplane system 130 analyzes the request to determine whether the mobile client system 110 can be trusted and whether the airline system 130 will provide access to the mobile client system 110. In an example, the PEP 190 receives the request from the mobile client system 110 and sends the request to the ION TNC challenger 200. The ION TNC challenger 200 can interpret the request including, for example, the TLV collection of parameters signed by the digital notary 170 and the system audit of the mobile client system 110. The ION TNC challenger can also check the validity of the device identity certificate, the location and/or the flight phase restriction of the device.

In query 320, the airplane system 130 determines whether the collection of security parameters has been sealed and/or signed by a recognized and/or trusted digital notary 170. In an example, the ION TNC challenger 200 determines whether the collection of security parameters has been sealed and/or signed by a recognized and/or trusted digital notary 170. The ION TNC challenger can have access to an onboard database of trusted and/or recognized digital notaries 170. The ION TNC challenger can validate signed data by checking against mobile client system data.

In step 330, if the airplane system 130 does not recognize and/or trust the digital notary 170 that sealed and/or signed the collection of security parameters, then the airplane system 130 does not provide access to the mobile client system 110 to the airplane system 130. In an example, the ION TNC challenger 200 can determine, for example, that a recognized and/or trusted digital notary did not seal and/or sign the collection of security parameters. The ION TNC challenger 200 then informs the PEP 190 to not provide access to the mobile client system 110 to the airplane system 130.

In step 340, if the airplane system 130 does recognize and/or trust the digital notary 170 that sealed and/or signed the collection of security parameters, then the airplane system 130 decrypts the sealed and/or signed collection of security parameters. In an example, the decryption of the sealed and/or signed collection of security parameters is based on an identity of the digital notary 170. In an example, the airplane system 130 can provide one or more keys (e.g., one or more data decryption keys) associated with the recognized and/or trusted digital notary 170 to decrypt the sealed and/or signed collection of security parameters. In an example, the ION TNC challenger 200 can determine, for example, that a recognized and/or trusted digital notary did seal and/or sign the collection of security parameters and can obtain the one or more keys stored in a database of the airplane system 130. In an example, the one or more keys were previously stored onboard the airline system 130. In an example, the ION TNC challenger 200 can provide data certificates stored in a database of the airplane system 130 that can be used, for example, to decrypt data received from the mobile client system 110.

In query 350, the airplane system 130 determines whether to provide the mobile client system 110 access to the airplane system 130 based on the decrypted collection of security parameters received from the mobile client system 110. In an example, access provided to the mobile client system 110 is based on the transmitted collection of security parameters without previously having information about the mobile client system 110, or prior to receiving the request and without a link to the network system 120.

In step 360, the airplane system 130 denies access to the mobile client system 110 to the airplane system 130. In an example, at least the PEP 190 and the PDP of the ION TNC challenger 200 can deny access based on the received decrypted collection of security parameters. For example, the received decrypted collection of security parameters might indicate a particular field location (e.g., "work only in Seattle") that is not satisfied.

Figure 3B:
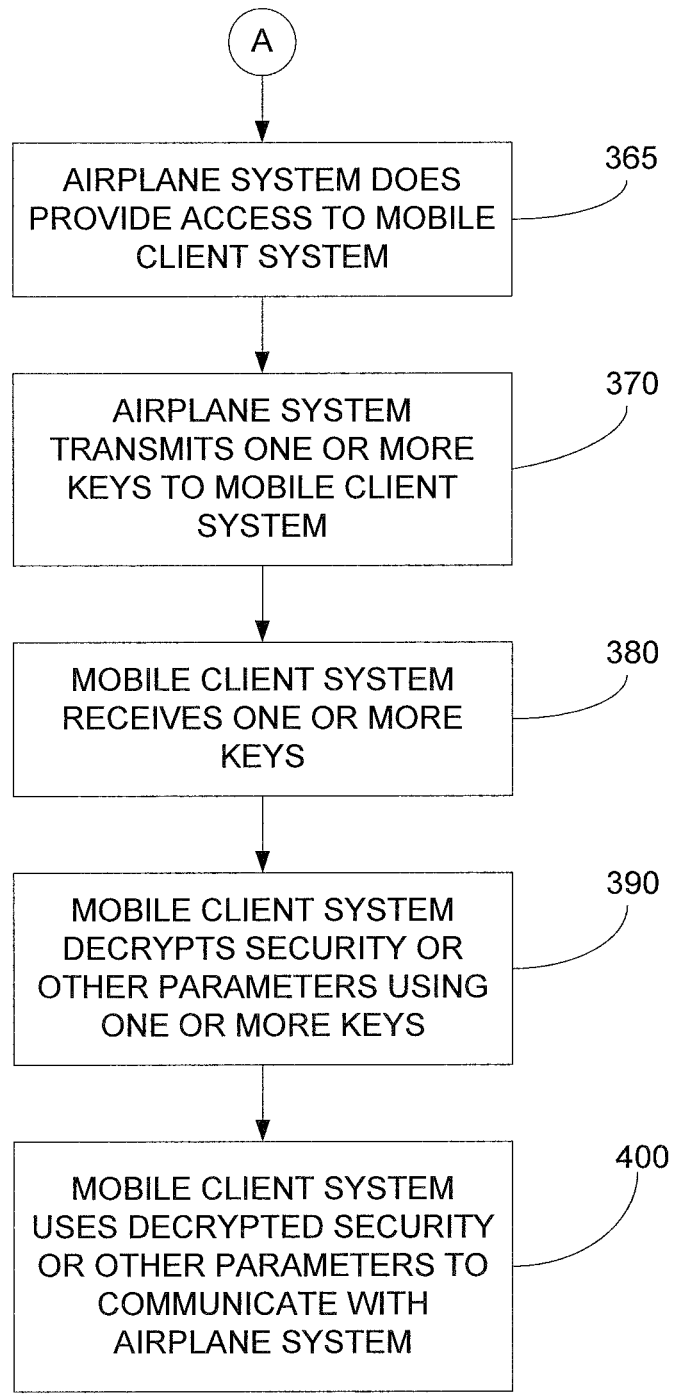

Referring to FIG. 3B, in step 365, the airplane system 130 provides access to the mobile client system 110 to the airplane system 130. In an example, at least the PEP 190 and the PDP of the ION TNC challenger 200 can provide access to the mobile client system 110 based on the received decrypted collection of security parameters. For example, based on the received decrypted collection of security parameters and the received system audit of the mobile client system 110, the airplane system 130 can determine particular onboard applications and particular onboard data that are to be accessible by the mobile client system 110. While accessing the airplane system 130, the mobile client system 110 can share data stored on the mobile client system 110, download data stored on the airplane system 130, upload data onto the airplane system 130, and/or install or update software (e.g., applications, operating system, etc.) running on the airplane system 130. Applications running on the mobile client system 110 such as, for example, the CAS application 140 can be used to maintain and operate applications and services on the airplane system 130.

In step 370, the airplane system 130 transmits one or more keys to the mobile system 110. In an example, the one or more keys received from the airplane system 130 are not the same as the one or more keys used by the airplane system 130, in step 340, to decrypt the sealed and/or signed collection of security parameters. The one or more keys received by the mobile client system 110 can be device-specific and/or application-specific. Thus, in an example, the mobile client system 110 can receive a plurality of sets of one or more keys to facilitate communication between the applications (e.g., pilot applications, maintenance applications, other mobile applications, etc.) of the mobile client system 110 and the airplane system 130.

In step 380, the mobile client system 110 receives the one or more keys transmitted by the airplane system 130.

In step 390, the mobile client system 110 uses the one or more keys to decrypt the collection of security parameters and/or other parameters and/or data stored therein. In an example, the one or more keys can be used by the mobile client system 110 to unseal and/or unsign the collection of security parameters, a portion of the collection of security parameters, or other parameters and/or data that are stored on the mobile client system 110. In an example, the one or more keys cannot be used to decrypt security parameters that were used by the airplane system 130 to assess the mobile client system 110. In an example, the TNC application wrapper 150 uses the one or more keys to decrypt or remove data (e.g., an application data section) residing in the mobile client system 110. In an example, the parameters and/or data that can be decrypted by the one or more keys include sensitive parameters and/or data that facilitate communications with the airplane system 130 such as, for example, port numbers (e.g., ports to network-based services of the airplane system 130), connection credentials for connecting to a service (e.g., user logins and passwords, etc.), auxiliary data needed for a mobile application to perform its functions, etc. Such information could have been stored on the mobile client system 110, for example, by the network system 120 and/or when the particular application was installed on the mobile client system 110.

In step 400, the mobile client system 110 uses the decrypted collection of security parameters, a decrypted portion of the collection of security parameters and/or other decrypted parameters and/or data to communicate with the airplane system 130. In an example, the one or more keys are application-specific and device-specific and decrypt particular information that can be used to facilitate communication between the specific application of the mobile client system 110 and the airplane system 130. In an example, the one or more keys can also be used to encrypt and/or decrypt communications between the mobile client system 110 and the airplane system 130. The mobile client system 110 can also include a security component (e.g., a Trusted Platform Module) that can be used to sign system data provided to the airplane system 130, which can guarantee the freshness of the security state information.

Figure 4:
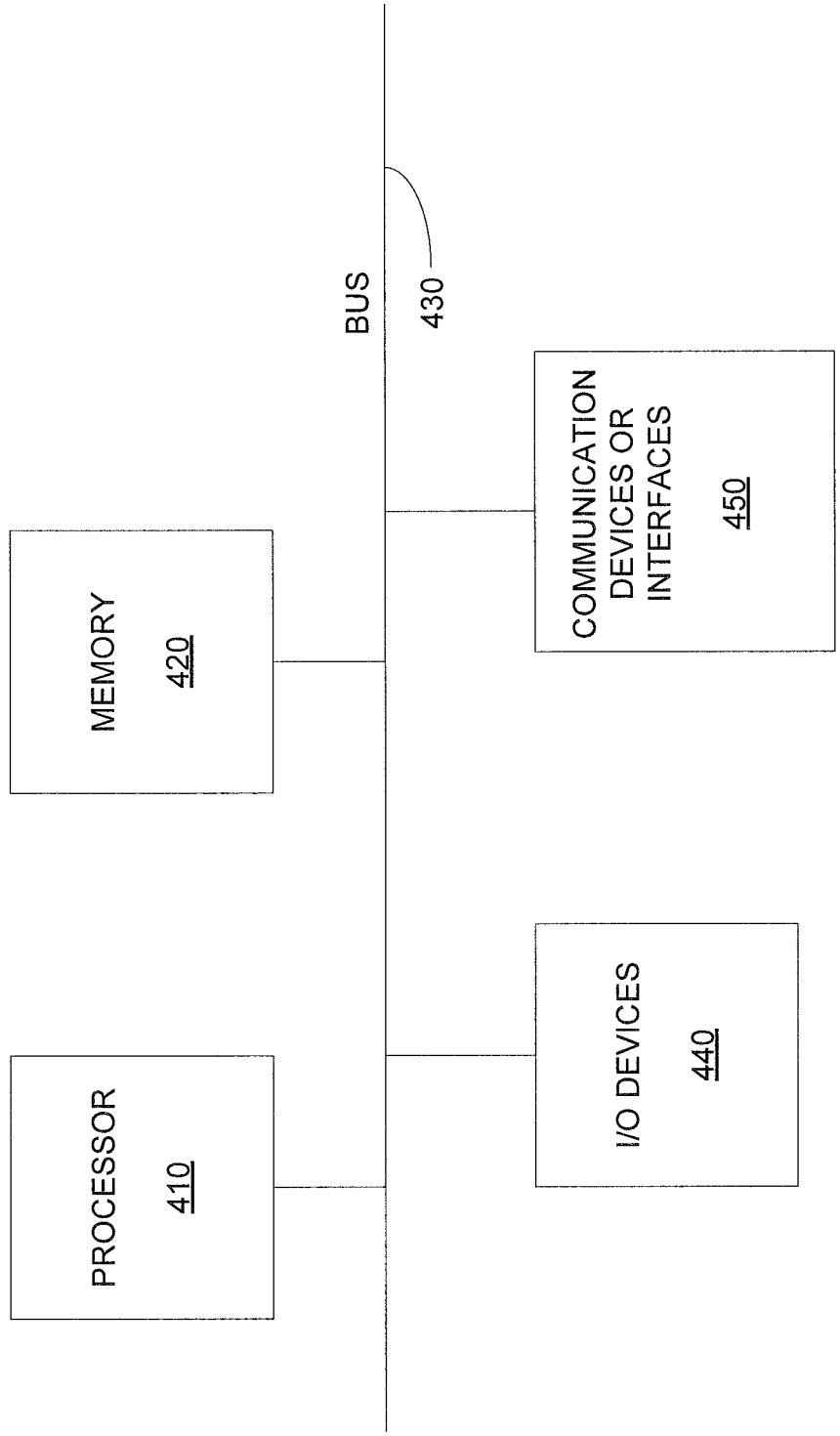
FIG. 4 shows an example of a mobile client system.

FIG. 4 shows an example of a mobile client system 110. The mobile client system 110 includes one or more processors 410 and one or more memories 420. The one or more processors 410 and the one or more memories 420 can be coupled via one or more buses 430. Input/output (I/O) devices or interfaces 440 are coupled to the one or more buses 430. The I/O devices or interfaces 440 can include, for example, displays, touch-sensitive screens, speakers, microphones, keyboards, etc. Communication devices or interfaces 450 are also coupled to the one or more buses 430. Communication devices or interfaces can include, for example, wireless transceivers and wired transceivers (e.g., an Ethernet interface). Wireless transceivers can support, for example, IEEE 802.11 wireless communications, Bluetooth communications, infrared communications, wireless local area network communications, cellular communications, satellite communications, etc. The wireless transceivers can each support one or more antennas.

Data, code and/or instructions can be stored on the one or more memories 420 and the code and/or instructions can be executed by the one or more processors 410 to provide applications, features, operations and/or functionality as set forth herein or as known by one of ordinary skill in the art. In an example, data, code and/or instructions can be executed by the one or more processors 410 to configure the one or more processors and the mobile client system 110 (e.g., a mobile wireless communication device) to receive a collection of security parameters from the network system on a per application basis and a per device basis, and to access the airplane system 130 based on the collection of security parameters when the mobile client system 110 and the airplane system 130 are offline with respect to the network system 120. The one or more processors 410 can also be configured to perform other operations as set forth herein.

In an example, the network system 120 and the airplane system 130 can include servers or computer systems with similar configurations as shown in FIG. 4. Data, code and/or instructions can be stored on the one or more memories 420 and the code and/or instructions can be executed by the one or more processors 410 to provide applications, features, operations and/or functionality for the network system 120 and the airplane system 130 as set forth herein or as known by one of ordinary skill in the art.

Some examples provide applications that implement trusted connections to processes and systems of airplane networks.

Some examples provide a comprehensive application and system assessment to establish a collection of security parameters on a per application and per device basis at the airline back-office system.

Some examples establish a chain of trust for the security parameters by using a digital notary arrangement to sign and seal a collection of security parameters that are stored in a mobile client device such as a mobile wireless device.

Some examples enable authoritative and non-repudiateable establishment of data integrity for data retrieved from resource-constrained mobile client systems (e.g., resource-constrained mobile client devices) in offline modes of connectivity with airplane systems.

Some examples permit the use of multiple data integrity authorities to verify integrity of data retrieved from a resource-constrained mobile client system.

Some examples provide for a resource-constrained mobile client system to maintain and provide a history of an authoritative cache of the airline back-office system to enable multiple airplane systems to use the mobile client system for e-Enabled functions without a priori information and/or awareness of the mobile client system by the airplane systems.

Some examples use a verified collection of security parameters on board the airplane to dynamically establish access control parameters for the mobile client system and application to various airplane networks, data and applications without prior knowledge of the mobile client system.

Some examples ensure that the integrity of COTS mobile devices is verified from a cyber-security perspective on a defined schedule by the airline back-office. Verification of the integrity of a particular COTS mobile device is a factor in determining whether the particular COTS mobile device should be allowed to connect to an e-Enabled airplane system when the e-Enabled airplane system and the COTS mobile device are operation constrained and unable to connect to the airline back-office.

Some examples provide that the mobile client system includes a security module or processor. The security module or processor can be configured, for example, to sign security parameters and a unique message from the airplane system with a captive key at the time the airplane system requests them. This guarantees that the parameters originate from an approved device (e.g., the signed and/or sealed collection of parameters has not simply been lifted off a compromised device). This also guarantees that the parameters describe the current state, not some stale state, of the device via the signed unique message (e.g., a nonce) from the airplane.

Other examples may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for integrated antenna transceiver for sensor and data transmission on rotating shafts.

Accordingly, the presently disclosed examples may be realized in hardware, software, or a combination of hardware and software. The present examples may be realized in a centralized fashion in at least one computer system, or in a distributed fashion where different elements are spread across several interconnected computer systems. Any kind of computer system or other system adapted for carrying out the methods described herein is suited. A combination of hardware and software may be a general-purpose computer system with a computer program that, when being loaded and executed, controls the computer system such that it carries out the methods described herein.

The presently disclosed examples may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While described with reference to certain examples, it will be understood by those skilled in the art that various changes may be made and equivalents may be substituted without departing from the scope of the presently described examples. In addition, many modifications may be made to adapt a particular situation or material to the teachings without departing from its scope. Therefore, it is intended that the presently disclosed examples not be limited to the particular example disclosed, but rather will include all examples falling within the scope of the appended claims.

What is claimed is:

1. A method for trusted mobile communications, comprising:
   receiving, at a network system, one or more characteristics of a mobile client system, the one or more characteristics determined based on a first audit of the mobile client system;
   provisioning, by the network system, the mobile client system with a collection of security parameters on a per application basis and a per device basis, the collection of security parameters determined as a function of the one or more characteristics of the mobile client system; and
   providing the mobile client system access to an airplane system in response to receiving the collection of security parameters and one or more characteristics of the mobile client system determined by a second audit of the mobile client system, the second audit performed when the collection of security parameters are presented to the airplane system, the mobile client system's access of the airplane system defined by the collection of security parameters and the one or more characteristics determined by the second audit of the mobile client system, the collection of security parameters provided to the airplane system when the mobile client system and the airplane system are offline with respect to the network system.

2. The method according to claim 1, comprising:
   at least one of signing or sealing the collection of security parameters by a digital notary; and
   storing the at least one of signed or sealed collection of security parameters on the mobile client system.

3. The method according to claim 2, comprising:
   sending, by the mobile client system, a request for access to the airplane system, wherein the request includes the at least one of signed or sealed collection of security parameters;
   decrypting, by the airplane system based on an identity of the digital notary, the signed or sealed collection of security parameters received from the mobile client system; and
   determining, by the airplane system, whether to provide the mobile client system access to the airplane system based on the decrypted collection of security parameters.

4. The method according to claim 3, wherein the determination by the airplane system includes determining particular onboard applications and particular onboard data that are to be accessible by the mobile client system based on the decrypted collection of security parameters.

5. The method according to claim 1, comprising:
   establishing a chain of trust for the collection of security parameters by using a digital notary.

6. The method according to claim 5, wherein the airplane system provides access to the mobile client system based on the established chain of trust without previously having information about the mobile client system.

7. A system for trusted mobile communications, comprising:
   a network system; and
   a mobile client system in communications with the network system when the mobile client system is online with respect to the network system;
   wherein the network system receives one or more characteristics of a mobile client system, the one or more characteristics determined based on a first audit of the mobile client system;
   wherein the network system provisions the mobile client system with a collection of security parameters on a per application basis and a per device basis, the collection of security parameters determined as a function of the one or more characteristics of the mobile client system;
   wherein the mobile client system is provided access to an airplane system in response to receiving the collection of security parameters and one or more characteristics of the mobile client system determined by a second audit of the mobile client system, the second audit performed when the collection of security parameters are presented to the airplane system, the mobile client system's access of the airplane system defined by the collection of security parameters and the one or more characteristics determined by the second audit of the mobile client system, the collection of security parameters provided to the airplane system when the mobile client system and the airplane system are offline with respect to the network system; and
   wherein at least one of the network system, mobile client system, and airplane system comprises one or more of logic hardware and executable code, the executable code being stored on one or more non-transitory machine-readable storage media.

8. The system according to claim 7, wherein the collection of security parameters is signed or sealed by a digital notary, and wherein the signed or sealed collection of security parameters is stored on the mobile client system.

9. The system according to claim 7, wherein a digital notary establishes a chain of trust for the collection of security parameters.

10. The system according to claim 9, wherein the airplane system provides access to the mobile client system based on the established chain of trust without previously having information about the mobile client system.

11. The system according to claim 7,
    wherein the mobile client system sends a request for access to the airplane system, wherein the request includes the collection of security parameters,
    wherein the airplane system decrypts the collection of security parameters received from the mobile client system based on an identity of a digital notary, and
    wherein the airplane system determines whether to provide the mobile client system access to the airplane system based on the decrypted collection of security parameters without previously having information about the mobile client system.

12. The system according to claim 11, wherein the airplane system determines particular onboard applications and particular onboard data that are to be accessible by the mobile client system based on the decrypted collection of security parameters.

13. A mobile wireless communication device, comprising:
    one or more memories; and
    one or more processors coupled to the one or more memories, wherein the one or more processors are configured to:
    transmit one or more characteristics of the mobile wireless communication device to the network system when a mobile wireless communication device is online with respect to a network system, the one or more characteristics determined based on a first audit of the mobile wireless communication device;

receive a collection of security parameters from the network system on a per application basis and a per device basis, the collection of security parameters used to provision the mobile wireless communication device by the network system based on the transmitted information; and access an airplane system in response to receiving the collection of security parameters and one or more characteristics of the mobile wireless communication device determined by a second audit of the mobile wireless communication device, the second audit performed when the collection of security parameters are presented to the airplane system, the mobile wireless communication device's access of the airplane system defined by the collection of security parameters and the one or more characteristics determined by the second audit of the mobile wireless communication device, the collection of security parameters provided to the airplane system when the mobile wireless communication device and the airplane system are offline with respect to the network system.

14. The mobile wireless communication device according to claim 13, wherein the collection of security parameters is signed or sealed by a digital notary before being received by the one or more processors, and wherein the one or more processors are configured to store the signed or sealed collection of security parameters in the one or more memories.

15. The mobile wireless communication device according to claim 13, wherein the airplane system provides access to the mobile wireless communication device without previously having information about the mobile wireless communication device.

16. The mobile wireless communication device according to claim 13, wherein the one or more processors are configured to:

send a request for access to the airplane system, wherein the request includes the at least one of signed or sealed collection of security parameters, receive one or more keys transmitted by the airplane system in response to the request, decrypt, using the one or more keys, other parameters or data stored in the one or more memories, wherein the one or more keys are application-specific, and facilitate communications between the mobile wireless communication device and the airplane system using the decrypted other parameters or the decrypted data.

17. The mobile wireless communication device according to claim 16, wherein the airplane system determines particular onboard applications and particular onboard data that are to be accessible by the mobile wireless communication device based on the decrypted collection of security parameters.

\* \* \* \* \*